March 18, 1924. 1,487,184
A. SAUNIER
BOLTING UP DEVICE AND TEMPORARY FASTENER
Filed Feb. 12, 1921
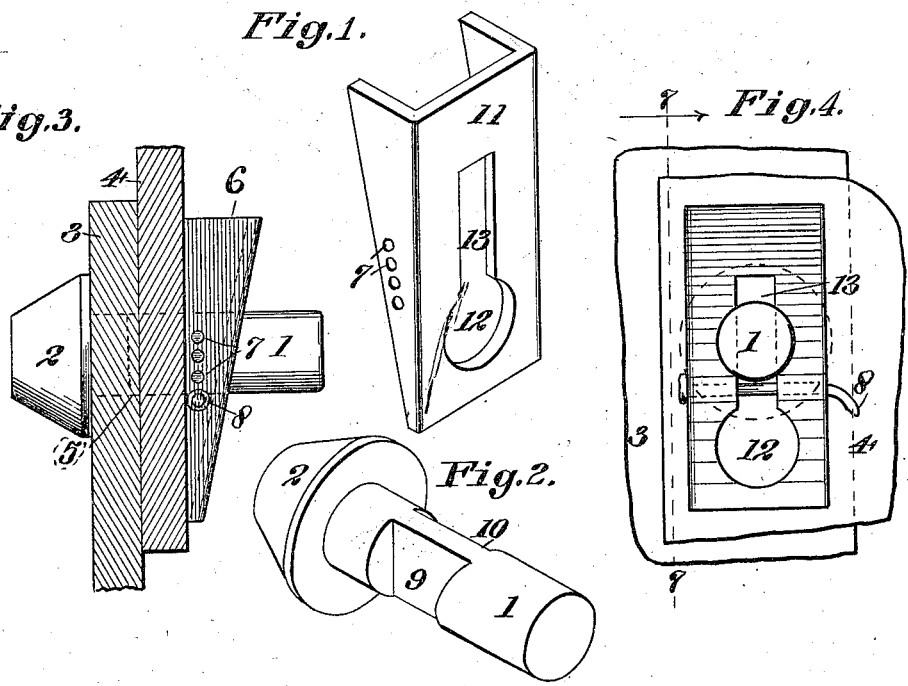
Inventor.
August Saunier.
By A.S. Paré
attorney.

Patented Mar. 18, 1924.

1,487,184

UNITED STATES PATENT OFFICE.

AUGUST SAUNIER, OF SAN FRANCISCO, CALIFORNIA, ASSIGNOR OF ONE-HALF TO EDMUND NELSON, OF OAKLAND, CALIFORNIA.

BOLTING-UP DEVICE AND TEMPORARY FASTENER.

Application filed February 12, 1921. Serial No. 444,354.

*To all whom it may concern:*

Be it known that I, AUGUST SAUNIER, a citizen of the United States, residing in the city and county of San Francisco and State of California, have invented certain new and useful Improvements in Bolting-Up Devices and Temporary Fasteners, whereof the following is a specification.

This invention relates to bolting up devices and temporary fasteners, for temporarily securing parts together whilst the permanent fastenings are applied, such parts being plates of ships' boilers, tanks, bridges, buildings, etc. In carrying out the invention I provide a headed pin, adapted to be inserted through registering holes in the parts to be secured; a wedge-shaped key adapted to engage the pin, and draw the parts together, means for facilitating said engagement, and, sometimes, a cotter pin to secure the wedge.

In the accompanying one sheet of drawing I have shown my fastener, and the manner of its use.

Figure 1 is an elevation, in perspective, showing a wedge-shaped key with perforations to receive the cotter pin.

Figure 2 is a perspective view of a headed pin, adapted to co-act with the wedge-shaped key of Figure 1.

Figure 3 is an elevation showing two plates held by the pin and wedge of Figures 1 and 2, the plates being in section taken on line 7, 7, of Figure 4.

Figure 4 is an elevation at right angles to Figure 3 showing the same parts.

Referring to the several figures of the drawing, a pin 1 having at one end, a head 2, is adapted to be inserted through two or more plates, or other members of a structure, as 3 and 4, and have the head 2 bear against the same at one side, whilst the shank 1 projects through said members which are provided with registering holes, shown in dotted lines, in Figure 3, which may be used for that purpose.

A wedge-shaped key 6, is adapted to engage the projecting end of pin 1, and draw tight the plates 3, 4. The wedge key 6 may be provided with a series of holes 7, in any desired number, to receive a cotter-pin 8, to prevent the jarring loose of wedge key 6. The engagement of the key with the pin is provided for by slotting the pin 1, so that the wedge may engage the plates 3, 4, on the one hand, and the edge of the slot on the other hand. The slot is at one side of pin 1, as at 9, and may be duplicated at the other side, as at 10. In the latter case the key may be doubled as shown, and the two parts connected by a back plate 11, which may be perforated and slotted as at 12, 13, to receive the pin and straddle the reduced portion thereof between the slots.

Having thus described my invention, and an embodiment of it, in the full, clear and exact terms required by law, and knowing that it comprises novel, useful and valuable improvements in the art to which it pertains, I here state that I do not wish to be limited to the precise construction and arrangement of the several parts, as herein set forth, as the same may be variously modified by a skilled mechanic without departing from the spirit of the invention.

What I claim and desire to secure by Letters Patent of the United States, is the following, to wit:—

1. A bolting up device and temporary fastener for structural parts, comprising in combination a head and shank, said shank having a registering lateral slot, a double key, each of a wedge-shaped, connected together by a back plate, said back plate having a longitudinal slot adapted to engage said lateral slot and means to hold said key in position upon said shank.

2. A bolting up device and temporary fastener for structural parts, comprising in combination a head and shank, said shank having registering lateral slots, a double wedge shaped key connected together by a back plate, said back plate having a perforation and a longitudinal slot communicating with said perforation, said perforation being adapted for the passage of said shank and said longitudinal slot engaging said lateral slots upon the shank.

3. A bolting up device and temporary fastener, comprising in combination a head and shank, said shank having registering slots in its sides with a web between them, a key plate having wedge-shaped side flanges connected together by a back plate, said back plate being perforated for the passage of said shank and having a longitudinal slot communicating with said perforation, said longitudinal slot on said back plate adapted to receive the web between said slots and said wedge-shaped side flanges having perforations adapted to receive a cotter pin for holding said key in position.

In testimony that I claim the foregoing I have hereto set my hand this 31 day of January, 1921.

AUGUST SAUNIER.